US 7,631,359 B2

(12) United States Patent
Cabrera et al.

(10) Patent No.: US 7,631,359 B2
(45) Date of Patent: Dec. 8, 2009

(54) HIDDEN PROACTIVE REPLICATION OF DATA

(75) Inventors: Luis Felipe Cabrera, Bellevue, WA (US); Marvin M. Theimer, Bellevue, WA (US); Christopher G. Kaler, Sammamish, WA (US)

(73) Assignee: Microsoft Corporation, Redmond, WA (US)

( * ) Notice: Subject to any disclaimer, the term of this patent is extended or adjusted under 35 U.S.C. 154(b) by 421 days.

(21) Appl. No.: 10/289,988

(22) Filed: Nov. 6, 2002

(65) Prior Publication Data

US 2004/0088580 A1 May 6, 2004

(51) Int. Cl.
*G06F 21/00* (2006.01)
*H04L 9/00* (2006.01)

(52) U.S. Cl. .......................... 726/26; 713/150; 713/193
(58) Field of Classification Search .................... 726/33
See application file for complete search history.

(56) References Cited

U.S. PATENT DOCUMENTS

| | | | | |
|---|---|---|---|---|
| 4,558,176 A | * | 12/1985 | Arnold et al. ................ | 713/190 |
| 5,812,398 A | * | 9/1998 | Nielsen ......................... | 705/1 |
| 5,835,954 A | * | 11/1998 | Duyanovich et al. ........ | 711/162 |
| 6,145,066 A | * | 11/2000 | Atkin .......................... | 711/165 |
| 6,192,472 B1 | * | 2/2001 | Garay et al. ................. | 713/165 |
| 6,292,800 B1 | * | 9/2001 | Eldreth ........................ | 707/10 |
| 6,324,650 B1 | * | 11/2001 | Ogilvie ........................ | 726/2 |
| 6,460,055 B1 | * | 10/2002 | Midgley et al. ............ | 707/204 |
| 6,477,583 B1 | * | 11/2002 | Zayas et al. ................. | 709/248 |
| 6,760,808 B2 | * | 7/2004 | Peters et al. ................. | 711/114 |
| 6,973,464 B1 | * | 12/2005 | Gao ............................. | 707/201 |
| 2001/0056546 A1 | * | 12/2001 | Ogilvie ........................ | 713/200 |
| 2002/0055942 A1 | * | 5/2002 | Reynolds .................... | 707/200 |
| 2002/0099959 A1 | * | 7/2002 | Redlich et al. ............... | 713/201 |
| 2002/0133590 A1 | * | 9/2002 | McBrearty et al. .......... | 709/225 |
| 2003/0145086 A1 | * | 7/2003 | O'Reilly ..................... | 709/226 |
| 2003/0191938 A1 | * | 10/2003 | Woods et al. ................ | 713/165 |

OTHER PUBLICATIONS

J. Gray, P. Helland, P. O'Neil, and D. Shasha. "The dangers of replication and a solution". In Proceedings of the 1996 ACM SIGMOD International Conference on Management of Data, pp. 173-182, Jun. 1996. http://citeseer.ist.psu.edu/gray96danger.html.*

(Continued)

Primary Examiner—Emmanuel L Moise
Assistant Examiner—Jeffery Williams
(74) Attorney, Agent, or Firm—Workman Nydegger (57) ABSTRACT

Moving replicas in a cryptographically secure manner such that the target location and timing of the movements are completely hidden from any user, or is kept as a secret by a limited number of users who have been given advanced notice of the new location and relocation time for a replica. A catalog of replica locations that describe the current location of the replicas is stored in encrypted form so as to prevent individuals from determining the exact location of the replicas. Since the location of the replicas is hidden at any given moment, attackers may not use the location of the replicas in order to attack all of the replicas at the same time. Accordingly, recovery mechanisms may have an opportunity to recover from any given attack by once again creating replicas from those replicas that had not been attacked.

25 Claims, 3 Drawing Sheets

OTHER PUBLICATIONS

J. Sidell, et al. "Data Replication in Mariposa," Proceedings of the 12th International Conference on Data Engineering (Feb. 1996). http://citeseer.ist.psu.edu/article/sidell96data.html.*

R. J. Anderson. The Eternity Service. In Proceedings of Pragocrypt '96, 1996. http://citeseer.ist.psu.edu/anderson96eternity.html.*

J. Wylie, M. Bigrigg, J. Strunk, G. Ganger, H. Kiliccote and P. Khosla. Survivable information storage systems. IEEE Computer, Aug. 2000. http://citeseer.ist.psu.edu/wylie00survivable.html.*

"Periodic" [definition], The American Heritage College Dictionary, $4^{th}$ ed., 2002, Houghton Mifflen Company.*

Ian Clarke, Oskar Sandberg, Brandon Wiley, and Theodore W. Hong. Freenet: A Distributed Anonymous Information Storage and Retrieval System. In Proc. of the ICSI Workshop on Design Issues in Anonymity and Unobservability, Berkeley, CA, 2000. International Computer Science Institute. http://citeseer.ist.psu.edu/clarke00freenet.html.*

Clarke, I. A distributed decentralised information storage and retrieval system, 1999. http://citeseer.ist.psu.edu/clarke99distributed.html.*

C. Baru, R. Moore, A. Rajasekar, and M. Wan. The SDSC Storage Resource Broker. In Procs. of CASCON'98, Toronto, Canada, 1998. http://citeseer.ist.psu.edu/baru98sdsc.html.*

Aschenbrenner, A. Long-Term Preservation of Digital Material. Thesis. Institut fr Softwaretechnik und Interaktive Systeme der Technischen Universitt Wien. 2001. http://citeseer.nj.nec.com/aschenbrenner01longterm.html http://citeseer.ist.psu.edu/aschenbrenner01longterm.html.*

M. Castro and B. Liskov. Practical Byzantine fault tolerance. In Proceedings of the 3rd USENIX Symposium on Operating Systems Design and Implementation, Feb. 1999. http://citeseer.ist.psu.edu/castro01practical.html.*

A. Rauber and A. Aschenbrenner. Part of our culture is born digital—On efforts to preserve it for future generations. TRANS. On-line Journal for Cultural Studies (Internet-Zeitschrift f ur Kulturwissenschaften), Jul. 10, 2001. http://www.inst.at/trans/10Nr/inhalt10.htm. http://citeseer.ist.psu.edu/rauber01part.html.*

B. Cooper and H. Garcia-Molin. Creating trading networks of digital archives. In E. Fox and C. Borgman, editors, Proceedings of the First ACM/IEEE Joint conference on Digital libraries (JCDL'01), pp. 353-362, Roanoke, VA, Jun. 24-28, 2001. ACM. http://www.acm.org/dl. http://citeseer.ist.psu.edu/cooper01creating.html.*

Tonda Benes. The strong eternity service. In Ira S. Moskowitz, editor, Proceedings of Information Hiding Workshop (IH 2001). Springer-Verlag, LNCS 2137, Apr. 2001. http://citeseer.ist.psu.edu/benes01strong.html.*

Rothenberg, J., Ensuring the Longevity of Digital Documents, 1995, Scientific American V.272, No. 1/Jan., p. 42, 1995.*

D. M. Roger Dingledine, Michael J. Freedman. The Free Haven project: Distributed anonymous storage service. In Proceedings of the Workshop on Design Issues in Anonymity and Unobservability, Jul. 2000. http://citeseer.ist.psu.edu/article/dingledine00free.html.*

Back, Adam. "The Eternity Service", 1997, Phrack Magazine vol. 7., www.cypherspace.org/adam/eternity/phrack.html.*

Kubiatowicz, J., Bindel, D., Chen, Y., Czerwinski, S., Eaton, P., Geels, D., Gummadi, R., Rhea, S., Weatherspoon, H., Weimer, W., Wells, C., and Zhao, B. 2000. OceanStore: an architecture for global-scale persistent storage. SIGPLAN Not. 35, 11 (Nov. 2000), 190-201. DOI= http://doi.acm.org/10.1145/356989.357007.*

* cited by examiner

HIDDEN PROACTIVE REPLICATION OF DATA

BACKGROUND OF THE INVENTION

1. The Field of the Invention

The present invention relates to data replication, and more particularly, to the proactive replication of data using a hidden or secret relocation algorithm that determines the target location and timing of the relocation in a cryptographically secure way.

2. Related Technology

Computing technology has transformed the way we work and play. Modern computer networking technologies and infrastructures allow for different applications and users to electronically access data even over vast distances relatively quickly using readily-available computer systems. Such computer systems may include, for example, desktop computers, laptop computers, Personal Digital Assistants (PDAs), digital telephones, or the like.

This high level of data availability allows for numerous useful services to be offered over the Internet or other networks. Indeed, the level of data availability is considered a critical performance component of many, if not most, network services. Customers often expect little, if any, interruptions in access to the data offered by given network services. However, there are cases in which data may be destroyed, thereby potentially causing significant, if not permanent, interruption in services that rely on access to that data.

For example, the computer system that stores the data may malfunction causing the stored data to be corrupted. Perhaps a user inadvertently deleted or saved a different item over the stored data. Perhaps a disgruntled or malicious person intentionally destroyed the data. Alternatively, the storage device that stores the data may be physically damaged or destroyed. Regardless of the failure mechanism, such destruction of data may be catastrophic depending on the importance and reconstructability of the data lost.

One conventional mechanism for guarding against such failure is to make multiple replicas of the data, and to store at least some of the replicas on different computer systems or even in different geographically remote locations. The goal of such replication is to continue data availability even if one of the data replicas becomes inaccessible or destroyed. Should one of the replicas be destroyed, the data may still be accessed via another of the replicas. In cases in which a minimum number of replicas is desired in order to allow a high degree of security that all replicas will not be destroyed, the recovery algorithm of the replication system may generate further replicas in order to compensate for any lost replicas.

The use of multiple replicas for guarding against such failure provides significant security against many failure mechanisms. For example, if data is inadvertently deleted or intentionally destroyed, the data may still be accessed from other replicas. If a computer system fails or the storage device is destroyed, the data may still be accessed from a replica on another computer system.

The use of multiple replicas assumes that there is a high degree of independence between potential failure mechanisms for at least some of the replicas. For example, if the anticipated failure mechanism was that the computer system fails, independence from this failure mechanism may be accomplished by storing a replica in another computer system. If the anticipated failure mechanism was a geographically related problem such as a power outage, intentional physical destruction or natural disaster, independence may be accomplished by storing the replicas at geographically remote distances. If the anticipated failure mechanism was an intentional destruction of the data by an antagonist (also colloquially referred to as a "hacker"), then independence may be hoped for if the antagonist is not aware of all of the replicas.

However, it is possible that individuals or organizations might perform a malicious, sophisticated, and concerted attack against all copies of the data substantially simultaneously. If such a malicious attacker were to destroy all of the data replicas before the system could respond by recreating other copies, then the data might be lost forever. The loss in data would occur regardless of the fact that the system had a recovery mechanism to recreate replicas once one was lost, since all the replicas would be lost prior to the recovery mechanism being successful in creating further replicas.

One critical piece of information that might be required in order to facilitate such a concerted attack is the location of each of the replicas. In accordance with the principles of the present invention, a replication system is described which guards against such attacks by moving the data around using a cryptographically secure algorithm such that the location of the replicas is either unknown to any user (even potentially system administrators), or is known to only a small group. Even if one were to know of the location of one or more thereafter would not be able to be used to determine the current location of the replica. Accordingly, a concerted attack against all of the replicas would more likely fail, thus allowing the replication system to more likely survive such an attack.

There are conventional replication systems that do move replicas around periodically. However, such replication systems move replicas around in order to perform what is called "software rejuvenation" or in order to perform other housekeeping purposes unrelated to obscuring the location of the replicas. Software rejuvenation is performed by gracefully terminating an application, and then restarting the application with a clean internal state. Such rejuvenation is performed in order to counter an effect called "software aging" in which the performance of software degrades over time. When it is time for one of the replicas of a software application to be rejuvenated, that replica is terminated and then restarted in a clean state. After terminating and before restarting, the replica may be moved to another location when, for example, the old location may be contributing or may be more susceptible to software aging.

The use of software rejuvenation in replication systems has not conventionally made attempts at obfuscating the target location and movement times for a replica. This is not surprising since performing such obfuscation of the target location would not advance the purpose of performing software rejuvenation. Accordingly, the occasional movement in replication systems due to software rejuvenation provides little, if any, protection against a concerted attack against all replicas, since the location of the replicas are not hidden, even though the locations are occasionally moved. If an antagonist could determine the old location of the replicas, the antagonist may often be able to determine the new location of the replicas.

BRIEF SUMMARY OF THE INVENTION

In accordance with the principles of the present invention, a replication system and method maintains a number of replicas of given data. The replication system may have a recovery mechanism that optionally replaces any damaged or lost replicas if the current number of replicas is too low for comfort. If all of the replicas were destroyed prior to the recovery mechanism generating new replicas, then the given data may be lost. The principles of the present invention protect against such a concerted attack by moving each of the replicas around in a less predictable or even completely random manner.

In particular, for each replica corresponding to given data, a relocation module within the replication system determines a target location to move the replica to, and even potentially determines when to move the replica. The target location and movement timing may be determined in a cryptographically secure manner using mechanisms such as a cryptographically generated random number.

The movement may also take into consideration non-random factors such as whether there is a current attack threat, the sensitivity of the data, the memory availability of the computer system corresponding to a potential target location, the processing load of the computer system corresponding to a potential target location, the bandwidth and latency of the connection between the current location of the replica and the potential target location, and the extent to which the computer system corresponding to the target location is trusted. However, as introducing such non-random factors into the relocation decision making can introduce some level of predictability into where a replica may be located, care should be taken not to weight such non-random factors into the decision making process too much.

The decision making process associated with relocation is cryptographically secure. For example, the code that corresponds to critical decision making may be fully or partially encrypted, and only decrypted prior to execution and without allowing users access to the decrypted decision making code. A catalog that identifies each of the replicas and lists their corresponding location may also be secured. For example, the catalog may be encrypted or otherwise have access limited to only authorized applications or uses. Since the replicas are moved around without divulging the new location of the replicas, and since there is no unencrypted catalog listing the replicas and their corresponding location or since the catalog is secured against unauthorized access, it is less likely that anyone would know the exact location of all of the replicas corresponding to given data. Accordingly, it would be much more difficult, if not impossible, to successfully complete a concerted attack against all of the replicas simultaneously. Accordingly, any attempted attack may be recovered from using the replication system's recovery algorithm.

The replication system may keep the new location of the replicas hidden from the user, or the replication system may give advanced notice to a limited number of users of the location and movement times of the replicas. The limited number of users would then closely guard that information as a secret. Either way, the opportunity for a concerted attack against all replicas for given data is substantially diminished, thereby improving the security of the data represented by the various replicas.

Additional features and advantages of the invention will be set forth in the description which follows, and in part will be obvious from the description, or may be learned by the practice of the invention. The features and advantages of the invention may be realized and obtained by means of the instruments and combinations particularly pointed out in the appended claims. These and other features of the present invention will become more fully apparent from the following description and appended claims, or may be learned by the practice of the invention as set forth hereinafter.

BRIEF DESCRIPTION OF THE DRAWINGS

In order to describe the manner in which the above-recited and other advantages and features of the invention can be obtained, a more particular description of the invention briefly described above will be rendered by reference to specific embodiments thereof which are illustrated in the appended drawings. Understanding that these drawings depict only typical embodiments of the invention and are not therefore to be considered to be limiting of its scope, the invention will be described and explained with additional specificity and detail through the use of the accompanying drawings in which.

DETAILED DESCRIPTION OF THE PREFERRED EMBODIMENTS

The principles of the present invention relate to methods, systems and computer program products for moving replicas in which the target location and potentially the timing of the movements are completely hidden from any user, or is kept as a secret by a limited number of users who have been given advanced notice of the new location and relocation time for a replica. Whether the new location and relocation times are completely hidden, or are kept as a secret by a few who were given advanced notice, the movements are coordinated by a cryptographically secure algorithm. In addition, a catalog of replica locations that describe the current location of the replicas is also stored in encrypted form so as to prevent unauthorized individuals from determining the exact location of replicas.

The embodiments of the present invention may comprise general-purpose or special-purpose computer systems including various computer hardware components, which are discussed in greater detail below. Embodiments within the scope of the present invention also include computer-readable media for carrying or having computer-executable instructions, computer-readable instructions, or data structures stored thereon. Such computer-readable media may be any available media, which is accessible by a general-purpose or special-purpose computer system.

By way of example, and not limitation, such computer-readable media can comprise physical storage media such as RAM, ROM, EEPROM, CD-ROM or other optical disk storage, magnetic disk storage or other magnetic storage devices, or any other media which can be used to carry or store desired program code means in the form of computer-executable instructions, computer-readable instructions, or data structures and which may be accessed by a general-purpose or special-purpose computer system.

In this description and in the following claims, a "network" is defined as any architecture where two or more computer systems may exchange data with each other. When information is transferred or provided over a network or another communications connection (either hardwired, wireless, or a combination of hardwired or wireless) to a computer system or computer device, the connection is properly viewed as a computer-readable medium. Thus, any such connection is properly termed a computer-readable medium. Combinations of the above should also be included within the scope of computer-readable media. Computer-executable instructions comprise, for example, instructions and data which cause a general-purpose computer system or special-purpose computer system to perform a certain function or group of functions.

In this description and in the following claims, a "computer system" is defined as one or more software modules, one or more hardware modules, or combinations thereof, that work together to perform operations on electronic data. For example, the definition of computer system includes the hardware components of a personal computer, as well as software modules, such as the operating system of the personal computer. The physical layout of the modules is not important. A computer system may include one or more computers coupled via a computer network. Likewise, a computer system may include a single physical device (such as a mobile phone or Personal Digital Assistant "PDA") where internal modules (such as a memory and processor) work together to perform operations on electronic data.

In this description and in the following claims, a "replica" of given data is a data structure (that may potentially include state) from which the given original data may be recovered. The replica may be a simple copy of the given data, an encrypted form of the given data, a compressed form of the given data, or any other form from which the given data may be recovered. The given data may be an entire object or data structure, or merely a portion thereof.

Those skilled in the art will appreciate that the invention may be practiced in network computing environments with many types of computer system configurations, including, personal computers, laptop computers, multi-processor systems, minicomputers, mainframe computers, network PCs, routers, gateways, firewalls, proxies, hand-held devices, microprocessor-based or programmable consumer electronics, mobile telephones, PDAs, pagers, and the like. The invention may also be practiced in distributed system environments where local and remote computer systems, which are linked (either by hardwired links, wireless links, or by a combination of hardwired or wireless links) through a communication network, both perform tasks. In a distributed system environment, program modules may be located in both local and remote memory storage devices.

Figure 1:
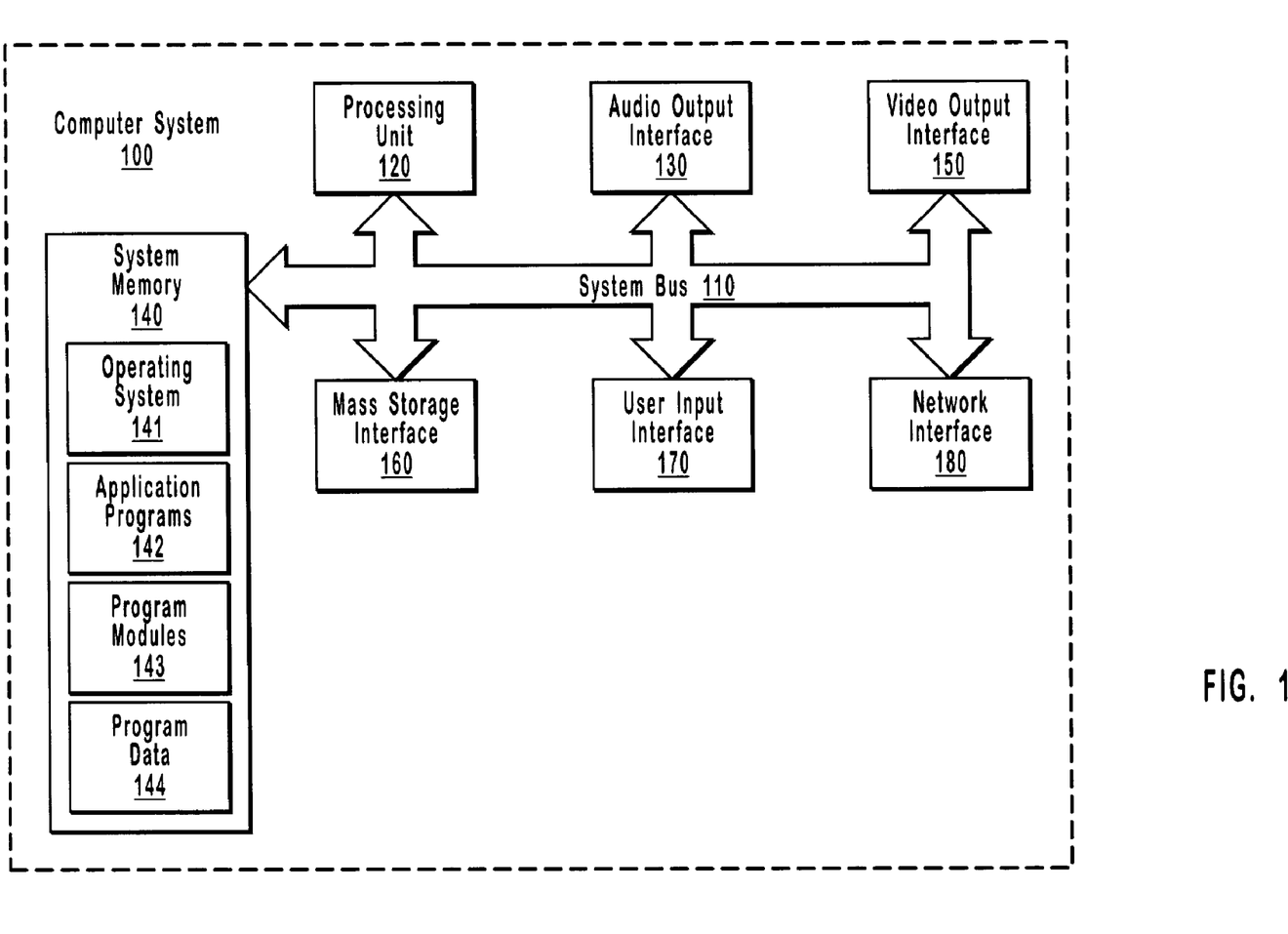
FIG. 1 illustrates a suitable computer system in which the principles of the present invention may be employed.

FIG. 1 and the following discussion are intended to provide a brief, general description of a suitable computing environment in which the invention may be implemented. Although not required, the invention will be described in the general context of computer-executable instructions, such as program modules, being executed by computer systems. Generally, program modules include routines, programs, objects, components, data structures, and the like, which perform particular tasks or implement particular abstract data types. Computer-executable instructions, associated data structures, and program modules represent examples of the program code means for executing acts of the methods disclosed herein.

With reference to FIG. 1, a suitable operating environment for the principles of the invention includes a general-purpose computer system in the form of a computer system 100. Computer system 100 may be, for example, a personal computer that has been adapted to perform the operations disclosed herein.

Computer system 100 includes a user input interface 170 that receives information from an input device, such as, for example, a keyboard, microphone, or mouse. An input device can be coupled to user input interface 170 so as to enable the entry of information. An input device may transfer information over such a coupling in response to preprogrammed data or user manipulation of the input device.

Computer system 100 includes a video output interface 150 that provides a video output signal to external video display devices. Computer system 100 may be integrally positioned with or separate from a video display device, such as, for example, a color or monochrome computer monitor. A video display device can be coupled to video output interface 150 so as to receive a provided video output signal.

Similarly, computer system 100 includes an audio output interface 130 that provides an audio output signal to external audio output devices. Computer system 100 may also be integrally positioned with or separate from an audio system, which may include a speaker or other device capable of emitting sound data. An audio system can be coupled to audio output interface 130 so as to receive a provided audio output signal. In some cases, a video display device or an audio system will be unnecessary including when the computer system 100 does not directly interface with a human.

Computer system 100 includes processing unit 120, which allows for complex and flexible general-purpose processing capabilities. Processing unit 120 executes computer-executable instructions designed to implement features of computer system 100, including features of the present invention. Processing unit 120 is coupled to system bus 110, which also interconnects various other system components including system memory 140.

System memory 140 generally represents a wide variety of volatile and/or non-volatile memories and may include types of memory previously discussed. However, the particular type of memory used in computer system 100 is not important to the present invention. Program code means comprising one or more program modules may be stored in system memory 140. The one or more program modules may include an operating system 141, one or more application programs 142, other program modules 143, and program data 144.

Computer system 100 may include mass storage interface 160, which can read data from and/or write data to a mass storage device, such as, for example, a magnetic disk or optical disk. A mass storage device can be coupled to mass storage interface 160 so as to enable the reading and writing of data. When a mass storage device is coupled to mass storage interface 160, one or more program modules including operating system 141, application programs 142, other program modules 143, and program data 144 may be stored in the mass storage device.

Computer system 100 is connectable to networks, such as, for example, an office-wide or enterprise-wide computer network, an intranet and/or the Internet. Computer system 100 includes network interface 180, through which computer system 100 receives data from external sources and/or transmits data to external sources. Computer system 100 may exchange data with external sources, such as, for example, remote processor systems and/or databases over such a network. Modern technology enables such network connections to be over high speed connections such as, for example, fiber optic connections.

FIG. 1 represents a suitable operating environment for the present invention, the principles of the present invention may be employed in any system that is capable of, with suitable modification if necessary, implementing the principles of the present invention. The environment illustrated in FIG. 1 is illustrative only and by no means represents even a small portion of the wide variety of environments in which the principles of the present invention may be implemented.

Figure 2:
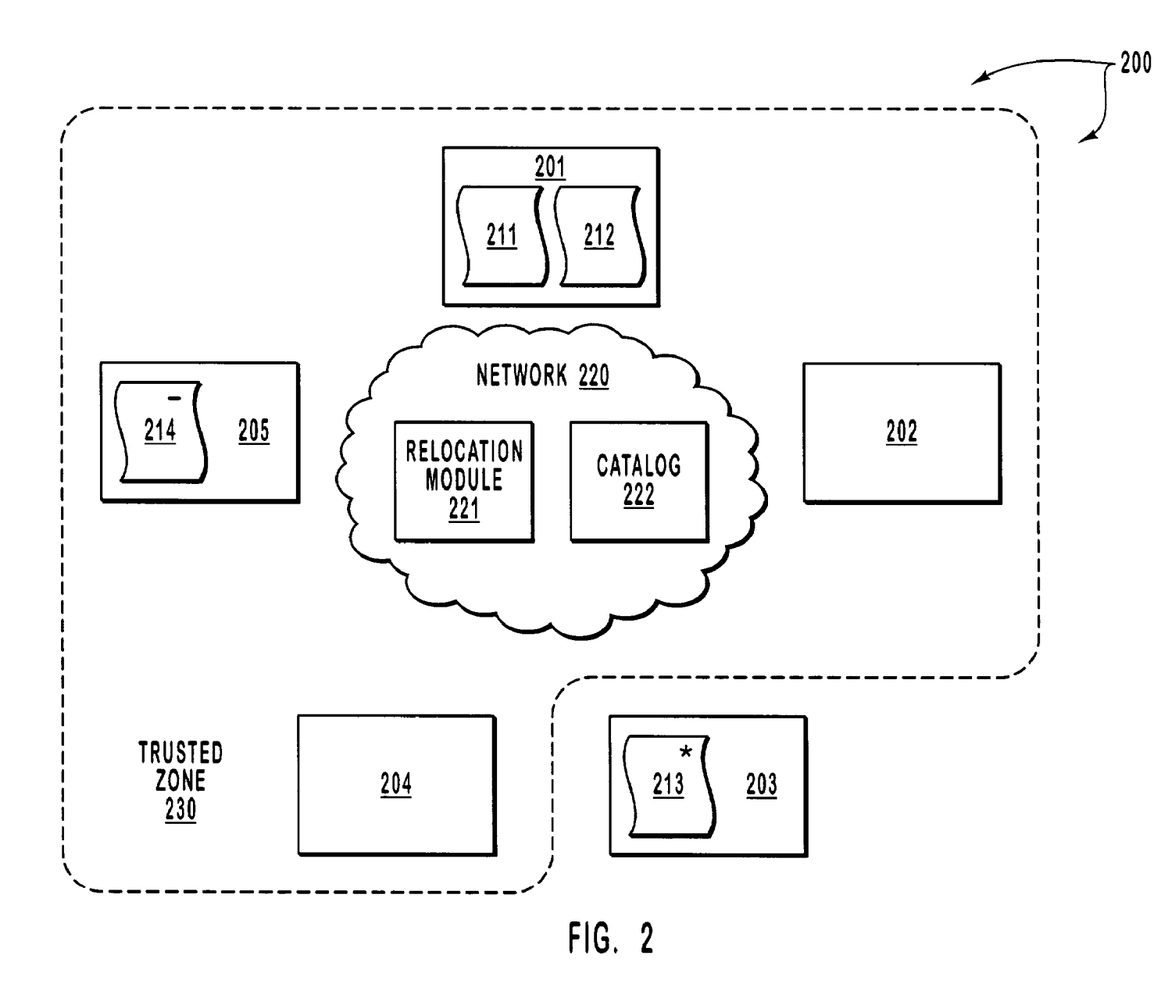
FIG. 2 illustrates a network environment in which the principles of the present invention may be employed.

FIG. 2 illustrates a network environment 200 in which the principles of the present invention may be employed. The network environment 200 includes a number of computer systems 201 through 205 that may communicate over a network 220. There are four replicas 211 through 214 of given data that are distributed throughout the computer systems 201 through 205. For example, computer system 201 stores two replicas 211 and 212 of the given data, while computer system 203 stores replica 213 and computer system 205 stores replica 214. Computer systems 202 and 204 do not currently store any of the replicas 211 through 214. A relocation module 221 manages the occasional relocation of the replicas 211 through 214 so as to hide the new location of each of the replicas from the public.

A catalog 222 has a record of the current location of each of the replicas 211 through 214. In order to guard against discovery of these locations, the catalog may be encrypted so that only those applications that possess a given key (e.g., the relocation module 221 and any trusted clients) may access the content of the catalog. The catalog may also be stored on a secure computing system that only allows access to the catalog through a process that verifies the identity and authority of an application or user attempting access.

While the relocation module 221 and the catalog 222 are generically illustrated within the network 220, they are only so illustrated to emphasize that the relocation module 221 and the catalog 222 act as a facilitator for moving replicas between different computer systems over the network 220. However, the relocation module 221 and/or the catalog 222 may be centrally located on one of the computer systems 201 through 205. In that case, however, the relocation module 221 would send messages over the network 220 instructing other computer systems on where and when to move a replica. However, unless such messages were sent over a secure communication channel, such messages may be intercepted thereby potentially allowing for an antagonist to determine where the replica will be or has been transferred to. In order to guard against this, the replication module 221 and the catalog 222 may be operated in a distributed manner, with some or all of the computer systems 201 through 205 each capable of executing an instance of the relocation module 221 or accessing and updating an instance of the catalog 222. In this way, fewer interceptable messages would be exchanged over the network 220. Updating of the catalog 222 may be accomplished by adding encrypted entries such that communication of catalog updates is not transmitted in the clear, without encryption. A relocation module may also be implemented on a computer system regardless of whether the computing system has any replicas stored thereon. A relocation module on a particular computing system may also be dedicated to managing only a portion (perhaps even just one) of the replicas stored thereon.

While the network environment 200 is illustrated as including five computer systems 201 through 205 that have distributed throughout four replicas 211 through 214, the principles of the present invention may operate with any number of computer systems with any number of replicas. For example, for less sensitive data, there may only be two replicas stored somewhere among three computer systems. However, for more sensitive data, there may be numerous replicas stored somewhere among many hundreds of computer systems. By having the distribution across many computer systems, it is more likely that an outside antagonist could not guess or find out where all of the replicas are located so as to engage in a concerted attack against all of the replicas.

Note that the replicas need not be exact copies of each other. For example, replica 214 has a minus sign on its upper right corner to emphasize that this replica may be a compressed form of the given data. For example, perhaps the computer system 205 has limited disk space available. Replica 213 has an asterisk on its upper right corner to emphasize that this replica may be an encrypted form of the given data. For example, the computer system 203 may reside in a different sphere of trust than the other computer systems 201, 202, 204 and 205. For example, computer systems 201, 202, 204 and 205 reside in trusted zone 230 while computer system 203 resides outside of the trusted zone 230.

Accordingly, in order to prevent the given data from being discovered by those outside of the trusted zone 230, the relocation module 221 may facilitate the encryption of the replica 213 when it was previously moved to the computer system 203. Accordingly, the computer system 203 may be enlisted within the replication system without having even to reside in the same trusted zone. This effect, along with recent advances in high bandwidth interconnectivity, allows for the described replication system to be more distributed even throughout the globe and without requiring that the replication system be encompassed within a common sphere of trust. Accordingly, the principles of the present invention may be used to offer the exchange of storage services between different enterprises.

Figure 3:
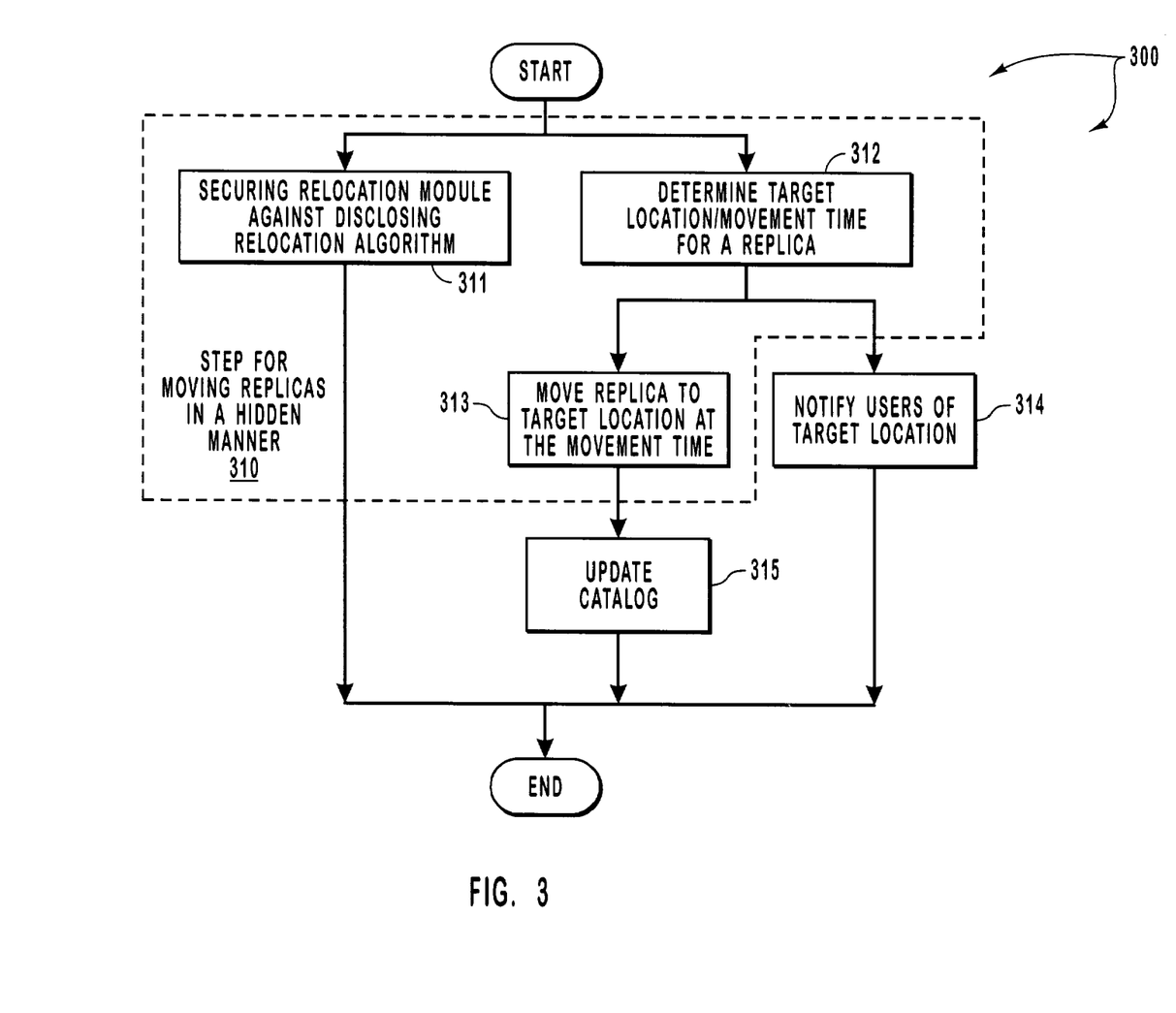
FIG. 3 illustrates a flowchart of a method for hiding replicas in accordance with the principles of the present invention.

FIG. 3 illustrates a flowchart of a method 300 for hiding the location of the replicas. The method 300 includes a functional, result-oriented step for moving replicas in a hidden manner (step 310). Although step 310 may include any corresponding acts for accomplishing this purpose, in the illustrated embodiment of FIG. 3, step 310 includes corresponding acts 311, 312 and 313.

In particular, the step 310 includes an act of determining a target location and/or movement time for a replica to be moved to using a relocation algorithm implemented by relocation module 221 (act 312). The movement may have an element of randomness so as to make it more difficult to predict where any given replica will be stored at any given time. In order to introduce such randomness into the relocation, the relocation module 221 may use a cryptographically secure random number generator so as to prevent antagonists from determining what the random number will be.

The relocation module 221 may also consider a number of non-random factors when considering where and when to move a given replica. For example, the relocation module 221 may consider whether there is a current attack threat. For example, if there is an attack threat detected for computer system 204, the relocation module 221 may eliminate or reduce the chance that a replica would be relocated to that computer system. A mechanism for detecting an attack threat is described in co-pending, commonly-owned U.S. patent application Ser. No. 10/185,008, entitled "Distributed Threat Management", and filed Jul. 1, 2002, which patent application is incorporated herein by reference in its entirety.

The relocation module 221 may also consider the sensitivity level of the data. For example, the greater the sensitivity of given data, the more frequently its replicas may be moved around. Also, the chance of sending the higher sensitive data to computer systems outside of the trusted zone may be reduced or even eliminated. For example, the computer system 203 might only serve as a storage site for replicas (even in encrypted form) if the corresponding data has less than a certain sensitivity level.

Also, the relocation module 221 may consider the trust level of computer system associated with the target location. For example, regardless of the sensitivity, the computer system 203 may have a lower probability of storing a replica than the other computer systems 201, 202, 204 and 205 for a given sensitivity level.

The relocation module 221 may also consider connection issues such as the bandwidth level for the connection to the target location, as well as load balancing issues such as the processing load level or memory availability level for the computer system associated with the target location.

The relocation module 221 may also store replicas at a location that has relatively low latency just for conveniences sake, rather than to protect against a concerted attack. For example, a Japanese language e-mail service may choose to store a number of data replicas locally in Japan while also storing some data replicas relatively randomly throughout the world.

Other types of non-random factors that may weigh into the relocation decision include the size of the data to be replicated, the frequency of use of the data, the number and location of the consumers, free or total disk space on the target machine, as well as what power management policy the source and target machine is using and what power management state they are in.

While weighing such non-random factors into the relocation decision may be useful, introducing too much weight for these non-random factors may introduce predictability into the decision making process thereby increasing the risk that an antagonist might guess the correct location of the replicas. This is particularly true where there are fewer computer systems in the replication system that may serve as potential storage sites. For example, if there were only two replicas of highly sensitive material distributed throughout three computer systems, one of the computer systems being outside of a zone of trust, one might guess that the two replicas are stored on one or both of the computer systems inside of the zone of trust. The replication system may consider how many potential storage site computer systems there are in order to weight how much non-random factors may play a role in the decision making process.

After the act of determining (act 312), the step 310 includes an act of moving the replica to the target location at the movement time (act 313). This is normally done by first creating a copy of the data in the target location and then deleting the copy from the source location. Optionally, the relocation module 221 may determine that the target location is on a computer system that is outside of trusted zone, and respond by establishing the replica only in encrypted form. Also, the relocation module 221 may determine that the target location is on a computer system that has memory resources that are lower than a threshold value, and respond by moving the replica only in compressed form whether or not the compressed data is also encrypted.

The step 310 includes an act of securing the relocation module against giving information identifying the target location/movement time to any user at least prior to the act of determining (act 311). For example, the relocation module may be prevented from giving any notice to any user at any time regarding the replica movements. In order to accomplish this, the computer-executable instructions of the relocation module may be encrypted at least for those portions that when executed by a processor form the relocation module and allow the relocation module to function. When it comes time to execute those instructions, the instructions are decrypted using a decryption module that does not allow user access to any resulting decrypted computer-executable instructions. Alternatively, one or more of the parameters in the instructions may be encrypted, rather than encrypting all of the instructions.

The relocation of a replica may be kept entirely hidden from any user as described above. Alternatively, however, a limited number of one or more trusted users may be notified of the relocation of the replica in terms of when and where the relocation will or has occurred (act 314). If this notification does occur, the notification may occur before or after the actual movement of the replica to the target location (act 312). Even so, the determination of where that target location is to be is first made before notification occurs. In other words, the relocation module 221 is cryptographically secure such that the target location and/or movement time cannot be inferred prior to the relocation module 221 itself determining where the target location and/or movement time will be. Less secure designs might also be appropriate if the environment the design is used in warrants it. For example, if the relocation module is run on a server machine that is in a physically secured room, it may be appropriate to rely on the operating system to implement restricted access to the relocation module.

The method 300 then updates the catalog 222 to reflect that the target location is associated with the replica (act 315). Once again, the catalog 222 (or portions thereof may be in encrypted form so as to make it more difficult for antagonists to discover the location of any of the replicas. In addition or in the alternative, the catalog may be stored on a secure server that only allows access after identification and authorization of an application or user requesting access.

Accordingly, the principles of the present invention make it much more difficult, if not impossible, for an antagonist to determine where all replicas of given data are at any given time. Accordingly, the opportunity for performing a concerted attack against all of the replicas of given data is substantially impaired. Accordingly, even if a few (but not all) of the replica locations are known, the recovery mechanism will more likely have time to recover from an attack by increasing the number of replicas available.

The present invention may be embodied in other specific forms without departing from its spirit or essential characteristics. The described embodiments are to be considered in all respects only as illustrative and riot restrictive. The scope of the invention is, therefore, indicated by the appended claims rather than by the foregoing description. All changes which come within the meaning and range of equivalency of the claims are to be embraced within their scope.

What is claimed is:

1. In an environment that includes a plurality of computer systems that may be used to store a plurality of movable replicas of given data in order to protect against loss of the given data in the event of a concerted attack aimed at locating and destroying it, a method for protecting the given data from destruction by occasionally moving the plurality of movable replicas from one computer system location to another so that the plurality of movable replicas are more difficult to find, the method comprising the following:

maintaining a centrally located catalog on a computer system, wherein the computer system on which the centrally located catalog is maintained is a single physical device;

maintaining a plurality of movable replicas of given data on a computer network, wherein the plurality of movable replicas of given data are distributed throughout at least a plurality of computer systems in the computer network and which are remote from the single physical device computer system on which the central catalog is maintained, the plurality of movable replicas each being repeatedly moved from its then current location to a new location in the computer network, as directed by the single physical device computer system on which the central catalog is maintained;

determining, at a centrally located relocation module on the single physical device computer system on which the central catalog is maintained, a specific target location in the network from among a plurality of potential target locations to which one of the plurality of movable replicas is to be relocated;

encrypting the centrally located relocation module to protect it from any unauthorized user so as not to provide information identifying the target location to which the one of the plurality of movable replicas is to be relocated;

after determining a specific target location, an act of the single physical device computer system on which the central catalog is maintained, using the centrally located relocation module located thereon, notifying one or more authorized individuals that the one of the plurality of movable replicas will be moved and of the specific target location thereof;

after notifying the one or more authorized users that the one of the plurality of movable replicas will be moved and of the specific target location thereof relocating the one of the plurality of movable replicas to the determined specific target location;

updating the centrally located catalog on the single physical device computer system, which centrally located catalog contains a current listing of all of the plurality of movable replicas of the given data and target locations to which each of the plurality of movable replicas has been relocated in order to keep track of where each of the plurality of movable replicas is stored once it is newly relocated; and at least partially encrypting the catalog centrally located on the single physical device computer system to secure it against unauthorized access.

2. A method in accordance with claim 1, further comprising the following:

the centrally located relocation module determining a movement time for the one of the plurality of movable replicas to be relocated to the target location.

3. A method in accordance with claim 2, wherein the centrally located relocation module considers whether or not there is a current attack threat when determining a movement time for the one of the plurality of movable replicas.

4. A method in accordance with claim 2, wherein the centrally located relocation module considers a sensitivity level of the given data when determining a movement time for the one of the plurality of movable replicas.

5. A method in accordance with claim 2, wherein the centrally located relocation module considers a trust level of a computer associated with the target location when determining a movement time for the one of the plurality of movable replicas.

6. A method in accordance with claim 2, wherein the centrally located relocation module considers a bandwidth level for a connection to the target location when determining a movement time for the one of the plurality of movable replicas.

7. A method in accordance with claim 2, wherein the centrally located relocation module considers a load level for a computer associated with the target location when determining a movement time for the one of the plurality of movable replicas.

8. A method in accordance with claim 2, wherein the centrally located relocation module considers a memory availability level for a computer associated with the target location when determining a movement time for the one of the plurality of movable replicas.

9. A method in accordance with claim 2, wherein the centrally located relocation module considers a network traffic load for a computer associated with the target location when determining a movement time for the one of the plurality of movable replicas.

10. A method in accordance with claim 2, wherein the centrally located relocation module considers how easy it would be to monitor network traffic to a computer associated with the target location when determining a movement time for the one of the plurality of movable replicas.

11. A method in accordance with claim 2, further comprising:

securing the centrally located relocation module against giving information identifying the movement time to any user at any time.

12. A method in accordance with claim 2, further comprising the following:

notifying one or more users of an association between the movement time and the one of the plurality of movable replicas.

13. A method in accordance with claim 12, wherein notifying one or more users of an association between the movement time and the one of the plurality of movable replicas comprises the following:

notifying the one or more users of the movement time prior to the movement time.

14. A method in accordance with claim 1, wherein encrypting the centrally located relocation module to protect it from any unauthorized user so as not to provide information identifying the target location to which the one of the multiple replicas is to be relocated, comprises the following:

encrypting at least a portion of computer-executable instructions that, when executed by a processor, form the centrally located relocation module and allow the centrally located relocation module to function; and prior to executing the portion of computer-executable instructions that are encrypted, decrypting the computer-executable instructions using a decryption module that does not allow user access to any resulting decrypted computer-executable instructions.

15. A method in accordance with claim 1, further comprising the following:

determining whether the target location is on a computer system that is outside of a trusted zone; and wherein the one of the plurality of movable replicas is moved in encrypted form when the target location is outside of the trusted zone, and in an unencrypted form when the target location is within the trusted zone.

16. A method in accordance with claim 1, further comprising the following:

determining that the target location is on an accessible computer system that has memory resources that are lower than a threshold value, wherein in response the one of the plurality of movable replicas is moved in compressed form.

17. A method in accordance with claim 1, wherein the centrally located relocation module considers whether or not there is a current attack threat when determining a target location for the one of the plurality of movable replicas.

18. A method in accordance with claim 1, wherein the centrally located relocation module considers a sensitivity level of the given data when performing the act of determining a specific target location for the one of the plurality of movable replicas.

19. A method in accordance with claim 1, wherein the centrally located relocation module considers a trust level of a computers associated with the target location when determining a target location for the one of the plurality of movable replicas.

20. A method in accordance with claim 1, wherein the centrally located relocation module considers a bandwidth level for a connection to the target location when determining a target location for the one of the plurality of movable replicas.

21. A method in accordance with claim 1, wherein the centrally located relocation module considers a load level for a computer associated with the target location determining a target location for the one of the plurality of movable replicas.

22. A method in accordance with claim 1, wherein the centrally located relocation module considers a memory availability level for an accessible computer associated with the target location when determining a target location for the one of the plurality of movable replicas.

23. A computer program product for use in a computing network that includes a plurality of computer systems distributed therein and in connection through the computing network, the computer program product for implementing a method for protecting data from destruction by occasionally relocating a plurality of movable replicas from location to another so that the plurality of movable replicas are more difficult to find and destroy, the computer-program product comprising:
one or more physical computer-readable storage media having stored thereon computer-executable instructions that, when executed, perform the method of claim 1.

24. In a computing network having a plurality of computers distributed therein and in communication over the computing network, a method for protecting data from destruction by occasionally relocating a plurality of movable replicas from one location to another so that the plurality of movable replicas are more difficult to find and destroy, the method comprising:
maintaining a plurality of movable replicas of given data, wherein the plurality of movable replicas of the given data are distributed throughout the plurality of computers in the computing network;
maintaining, on only one of the plurality of computers, a relocation module for managing occasional relocation of each of the plurality of movable replicas of the given data;
maintaining, on the one of the plurality of computers on which the relocation module is maintained, only one catalog that contains a record of each of the plurality of movable replicas of the given data and associates each of the plurality of movable replicas with its corresponding current location of each of the plurality of movable replicas of the given data, and such that the catalog is centrally located on the one of the plurality of computers, wherein the one of the plurality of computers on which the relocation and catalog are maintained is a secure computer requiring verification of an identity and authority of a user attempting access to at least the catalog centrally located on the secure computer;
determining, at the relocation module maintained on the secure computer, and for one of the plurality of movable replicas of the given data, a target location to which the one of the plurality of movable replicas will be moved, the target location being in the network and determined from among locations on the plurality of computers, wherein the one of the plurality of movable replicas for which a target location is determined is on a computer remote from the secure computer on which the relocation module and catalog is maintained;
notifying one or more authorized users of the target location of the one of the plurality of movable replicas of the given data;
after notifying the one or more authorized users, sending, from the relocation module maintained on the secure computer, instructions, to the computer remote from the secure computer and on which the one of the plurality of movable replicas is maintained, for moving the one of the plurality of movable replicas to the target location, wherein the instructions cause relocation of the replica to the target location;
updating the catalog to include the target location as a current location for the one of the plurality of movable replicas; and
repeating the acts of determining, notifying, sending and updating occasionally, for each of the plurality of movable replicas of the given data, such that the relocation module manages occasional relocation of each of the plurality of movable replicas of the given data.

25. A computer program product for use in a computing network that includes a plurality of computers distributed therein and in connection through the computing network, the computer program product for implementing a method for protecting data from destruction by occasionally relocating a plurality of movable replicas from one location to another so that the plurality of movable replicas are more difficult to find and destroy, the computer-program product comprising:
one or more physical computer-readable storage media having stored thereon computer-executable instructions that, when executed, causes the computing network to perform the process of:
maintaining plurality of movable replicas of given data, wherein the plurality of movable replicas of the given data are distributed throughout the plurality of computers in the computing network, and wherein the number of the plurality of movable replicas is proportional to a sensitivity of the given data;
maintaining, on only one of the plurality of computers, a relocation module for managing occasional relocation of each of the plurality of movable replicas of the given data, wherein the one of the plurality of computers on which the relocation is maintained includes none of the plurality of movable replicas of the given data;
maintaining, on the one of the plurality of computers on which the relocation module is maintained, only one catalog that contains a record of each of the plurality of movable replicas of the given data and associates each of the plurality of movable replicas with its corresponding current location of each of the plurality of movable replicas of the given data, and such that the catalog is centrally located on the one of the plurality of computers, wherein the one of the plurality of different computers on which the relocation and catalog are maintained is a secure computer requiring verification of an identity and authority of a user attempting access to at least the catalog centrally located on the secure computer;
determining, at the relocation module maintained on the secure computer, and for one of the plurality of movable replicas of the given data, a target location to which the one of the plurality of movable replicas will be moved, the target location being in the network and determined from among locations on the plurality of computers, wherein the target location is determined in a completely random manner and wherein the one of the plurality of movable replicas for which a target location is determined is on a computer remote from the secure computer on which the relocation module and catalog is maintained;

determining, at the relocation module maintained on the secure computer, and for the one of the plurality of movable replicas of the given data, a movement time at which the one of the plurality of movable replicas will be moved to the target location, wherein determining the movement time comprises the relocation module on the one of the plurality of computers considering at least three or more of a group selected from the following:
  whether the target location is subject to a threat of an attack;
  the sensitivity of the given data;
  a trust level of a computer associated with the target location;
  a bandwidth level for a connection to the target location;
  a load level for the computer associated with the target location;
  a memory availability level of an online and accessible computer associated with the target location;
  a network traffic load for the computer associated with the target location; and
  an ease of monitoring network traffic to the computer associated with the target location;
after determining the target location and movement time, the relocation module notifying one or more authorized users of the target location and movement time of the one of the plurality of movable replicas of the given data, the movement time being in the future;
after notifying the one or more authorized users, sending, from the relocation module maintained on the secure computer, instructions, to the computer remote from the secure computer and on which the one of the plurality of movable replicas is maintained, for moving the one of the plurality of movable replicas to the target location, wherein the instructions cause relocation of the one of the plurality of movable replicas to the target location;
updating the catalog to include the target location as a current location for the one of the plurality of movable replicas;
repeating the acts of determining, notifying, sending and updating occasionally, for each of the plurality of movable replicas of the given data, such that the relocation module manages occasional relocation of each of the plurality of movable replicas of the given data, and wherein repeating the acts comprises:
  modifying at least some of the plurality of movable so that not all replicas are exact copies;
  determining that at least one of the plurality of movable replicas has been lost or damaged; and
  in response to determining that at least one of the plurality of movable replicas has been lost or damaged, a recovery mechanism replacing the at least one of the plurality of movable replicas that has been lost or damaged.

\* \* \* \* \*